(12) United States Patent
Lillevold

(10) Patent No.: US 6,230,284 B1
(45) Date of Patent: May 8, 2001

(54) INITIATING CORRECTIVE ACTION AFTER THE OCCURRENCE OF A PROGRAM ERROR

(75) Inventor: Karl O. Lillevold, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/066,175

(22) Filed: Apr. 24, 1998

(51) Int. Cl.[7] ................................................ H04L 1/22
(52) U.S. Cl. ................................ 714/13; 713/15; 713/18
(58) Field of Search ................................ 714/13, 15, 18, 714/474

(56) References Cited

U.S. PATENT DOCUMENTS

| | | | | |
|---|---|---|---|---|
| 5,940,074 | * | 8/1999 | Britt, Jr. et al. | 345/333 |
| 5,959,596 | * | 9/1999 | McCarten et al. | 345/333 |
| 6,009,274 | * | 12/1999 | Fletcher et al. | 395/712 |
| 6,023,268 | * | 2/2000 | Britt, Jr. et al. | 345/327 |

* cited by examiner

*Primary Examiner*—Ly V. Hua
(74) *Attorney, Agent, or Firm*—Trop, Pruner & Hu, P.C.

(57) ABSTRACT

A program is executed on a first computer. In response to an error being detected in the execution of the program, the computer automatically retrieves revision code stored on another computer to revise the program.

24 Claims, 4 Drawing Sheets

INITIATING CORRECTIVE ACTION AFTER THE OCCURRENCE OF A PROGRAM ERROR

BACKGROUND

The invention relates to initiating corrective action after the occurrence of a program error.

Many computer programs have errors, or "bugs," that cause execution of the program to terminate prematurely, or "crash." When a crash occurs, the computer may display (on a monitor) a memory location that informs a user of the computer where the crash occurred, and the computer might display information (the contents of registers of a microprocessor of the computer, for example) that informs the user about a state of the computer when the crash occurred.

After the occurrence of an error, the user might use the computer to contact another computer (a server computer coupled to the Internet, for example) that stores a database maintained by a provider of the program. The database may include revision program code, or a "patch," for revising the program to prevent reoccurrence of the error. In this manner, after a crash occurs, the user might download and install the revision program code to revise the program.

The database might include numerous files of revision program code for many different types of encountered errors. In order for the computer storing the database to identify the appropriate revision code, the user might copy all of information displayed by the computer after the crash and provide this information to the computer storing the database to download the appropriate code. If the code is not present in the database, the user might terminate the connection between the computers without informing the computer storing the database about the encountered error.

Thus, there is a continuing need for an arrangement that improves the efficiency and error reporting capability of such a system.

SUMMARY

Generally, in one embodiment, when an error occurs in the execution of a program by a computer, the computer automatically retrieves revision program code from another computer to revise the program.

In another embodiment, a method includes executing a program on a computer. The method also includes detecting when an error occurs in the execution of the program. After detection of the error, the computer automatically prompts a user for an input and based on the input, retrieves revision program code from another computer to revise the program.

In yet another embodiment, a computer system includes a computer. The computer includes a microprocessor and a memory to store an application program. The microprocessor executes the program, detects the occurrence of the error in the execution of the program, and after detection of the error, automatically retreives data from another computer to to revise the program.

Advantages and other features of the invention will become apparent from the following description, from the drawing and from the claims.

DETAILED DESCRIPTION

Figure 1:
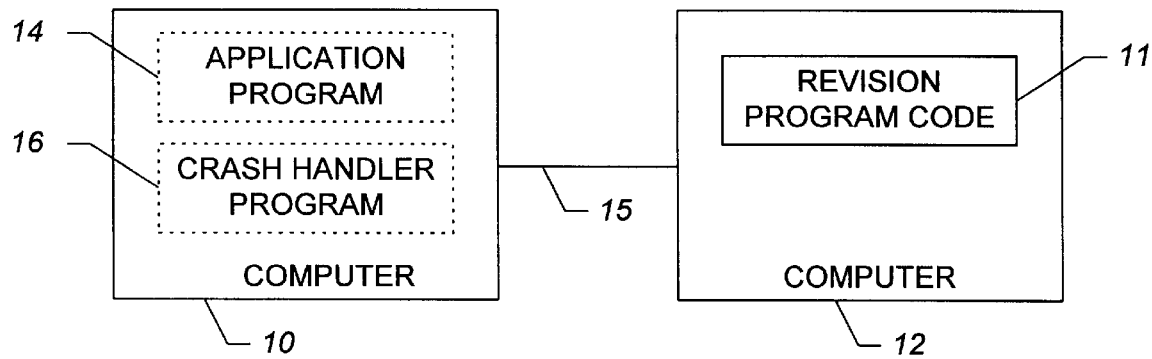
FIG. 1 is a block diagram of a computer system.

Referring to FIG. 1, an embodiment 16 of a crash handler program in accordance with the invention causes a computer 10 to detect when an error occurs in the execution of an application program 14 so that the error does not reoccur. This error might cause, for example, the program 14 to terminate prematurely or "crash." When the crash occurs, in some embodiments, the crash handler program 16 causes the computer 10 to automatically initiate corrective action to revise the program 14.

In this context, the term "corrective action" may include any action the computer 10 undertakes to revise, fix or "patch" the program 14 so that the error does not reoccur. For example, the computer 10 may automatically contact another computer 12 (a server computer coupled to the Internet, for example) and transmit information (described below) about the crash to the computer 12. Based on this information, the computer 12 may identify the error(s) that caused the crash and use this identification to search its file directory for revision program code 11 that, once installed on the computer 10, prevents reoccurrence of the crash.

If the revision program code 11 exists, the computer 10 may download a copy of the code 11 from the computer 12 and install the revision program code 11. In some embodiments, the crash handler program 16 causes the computer 10 to automatically perform both the downloading and the installation of the revision program code 11.

Corrective action also includes, for example, the computer 10 prompting the user with options that include the option to immediately contact the computer 12 and the option to postpone this contact until a later time.

The advantages of having the computer 10 automatically initiate corrective action may include one or more of the following. Information describing the error(s) may be automatically transmitted to the computer 12 so that the computer 12 may accurately identify the error. The crash handler program 16 may identify the appropriate computer that stores the program revision code. Previously undocumented error(s) in a program may be documented. Occurrences of particular errors in an application program may be tracked. Other advantages may be possible.

Figure 2:
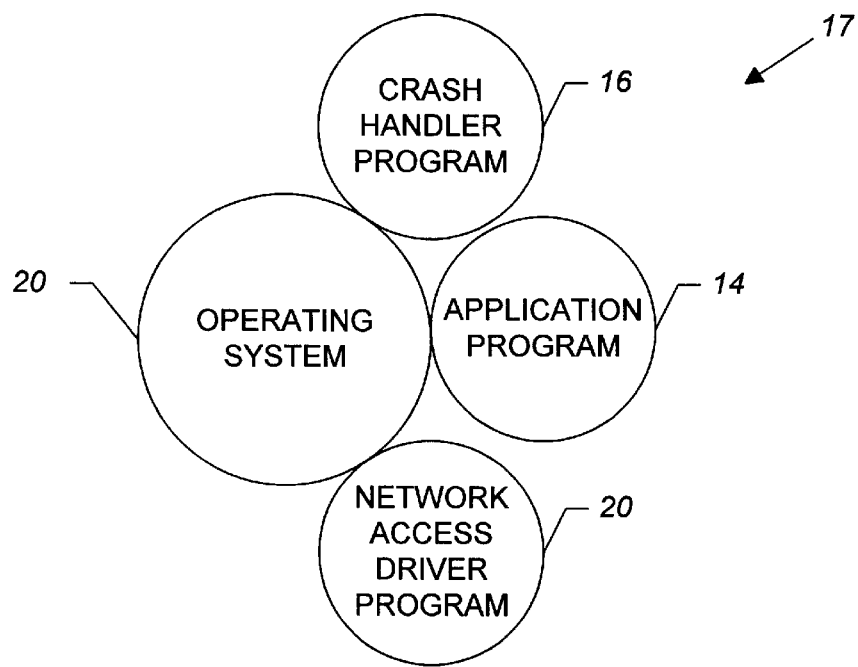
FIG. 2 is a schematic diagram illustrating a software architecture of one of the computers of FIG. 1 according to an embodiment of the invention.

Referring to FIG. 2, the computer 10 may have a software architecture 17 that includes an operating system 18. The operating system 18, in some embodiments, includes a Windows operating system (Windows 95®, for example) and a disk operating system (MS-DOS® 6.22, for example). The application program 14 may be a Windows® application program and may (via the operating system 18) interact with a network access driver program 20 to access the computer 12 (over the Internet, for example).

In some embodiments, the application program 14 may operate independently of the crash handler 16. In this manner, the crash handler 16 may be activated when the application program 14 crashes which, in some embodiments, is indicated by the occurrence of one or more interrupt requests of a class of crash interrupt requests (a nonmaskable interrupt request, for example). In this manner, the crash handler program 16 may trap, or "hook," one of the interrupt requests by selectively storing the entry address of the crash handler program 16 in an interrupt table of the computer 10, as described below.

Each entry of the interrupt table includes an address for an interrupt handler program. The entries are indexed by potential interrupt requests that might occur in the computer 12. In this manner, the crash handler program 16 ensures that the addresses of the table that are associated with interrupt requests from the class of crash interrupt requests point to the entry address of the crash handler program 16.

As a result, when a crash occurs, control is directed to the crash handler program 16 instead of to handlers that might abort the application program 14, for example. When activated, the crash handler program 16 determines the state of the computer 10 when the crash occurred and passes this state to the computer 12 to identify the error(s) that caused the crash.

In some embodiments, the crash handler program 16 reads the contents of the registers of a microprocessor of the computer 10 to determine the state of the computer 10. The computer 10 then furnishes this state to the computer 12, and based on this information, the computer 12 may then furnish the appropriate program revision code 11 to the computer 10.

For some embodiments, the crash handler 16 may be a Windows® application program, for example.

To hook, or trap, the class of interrupts that indicate a crash of the program 14, during installation of the crash handler program 16, an installation program may cause the computer 10 (via a Windows® API routine, for example) to perform one or more writes to entries of an interrupt descriptor table (IDT), the interrupt table used by Windows® application programs. Each entry stores information (vector information, for example) about an associated interrupt request. In each of these writes, the address that is associated with an interrupt request from the class of crash interrupt requests, is replaced by the address of the crash handler program 16. As a result, when the crash occurs, control is first transferred to the crash handler program 16.

The crash handler 16, in some embodiments, may insert itself as a link in a chain of interrupt service routines. In this manner, upon completion, the crash handler 16 may pass control to the interrupt service routine that was originally pointed to by the entry(ies) of the interrupt vector table.

Figure 3:
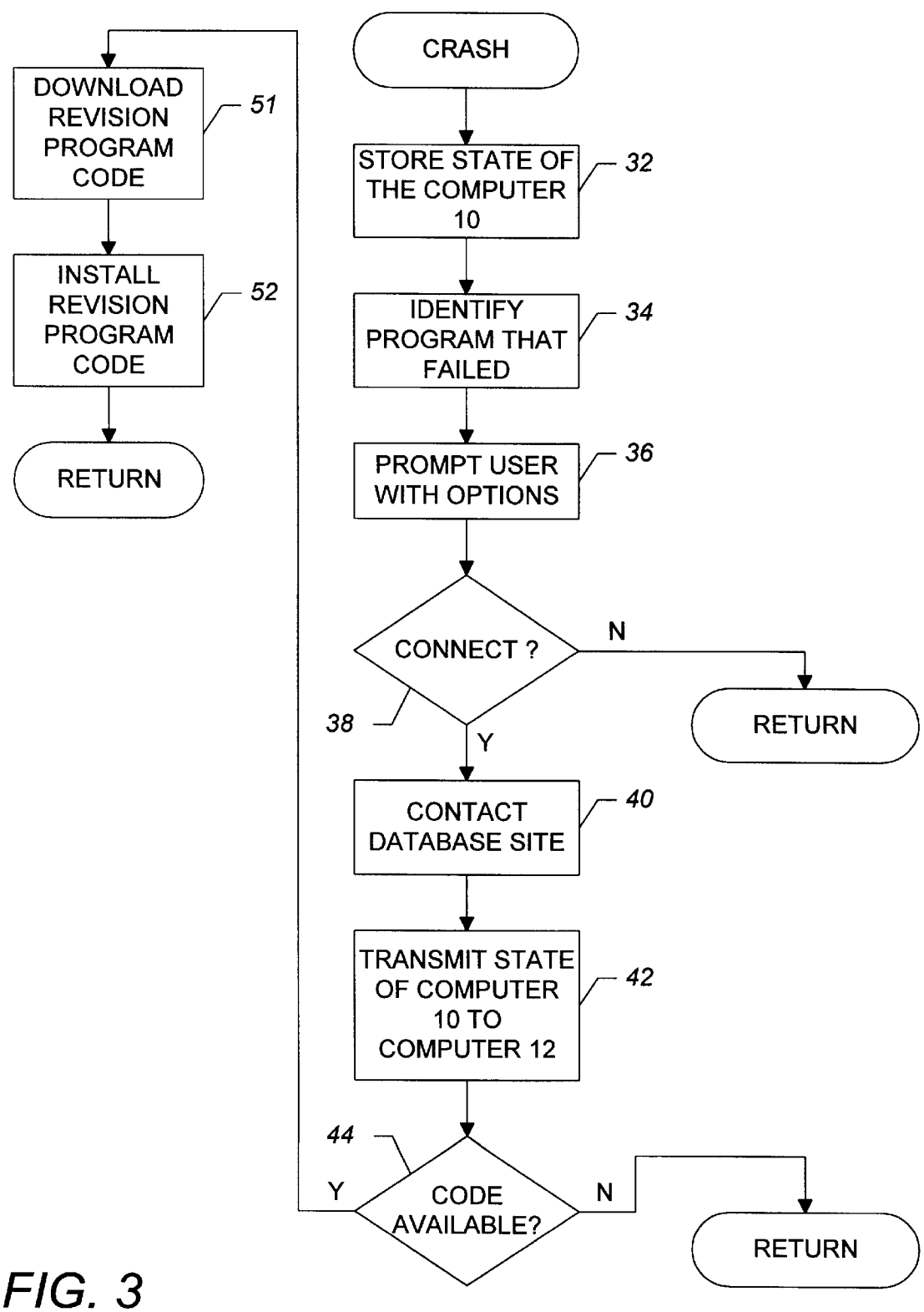
FIG. 3 is a flow diagram illustrating an algorithm to revise a program that is executed by one of the computers of FIG. 1.

Referring to FIG. 3, as an example of a routine (called CRASH) of the crash handler program 16, the routine first causes the computer 10 to store (block 32) the state of the computer 10 (i.e., the state of the computer 10 when the crash occurred). Next, in the execution of the routine, the computer 10 identifies (block 34) the application program that has failed. The computer 10 might do this by, for example, by using one or more dynamic link library (DLL) routines of the Windows® operating system. Another way includes the computer 10 comparing the contents of a program code pointer to the ranges of addresses allocated to applications that are installed on the computer 10. These ranges might be provided by an application registry of the computer 10.

The computer 10 then prompts (block 36) the user with options that might include, for example, an option to contact the computer 12 or wait to contact the computer 12 until another time. The options may also include the option to install the revision program code 11 (if available) after the code 11 is downloaded. In response to the user's selection, the computer 10 next determines (diamond 38) whether to contact the computer 12. If so, the computer 10 references a local database (stored in a memory of the computer 10) to determine the address of the computer 12 that stores the revision program code for the particular application 14. Next, the computer 10 interacts with the network access handler 20 to contact (block 40) the computer 12. Once contacted, the computer 10 transmits (block 42) the state of the computer 10 (at the time of the crash) to the computer 12.

Based on the state of the computer 10 at the time of the crash, the computer 12 determines whether the revision program code 11 is available, and if so, indicates this availability to the computer 10. In response, the computer 10 then determines (diamond 44) whether revision code is available. If not, the computer 10 returns from the CRASH routine.

Otherwise, the computer 10 downloads (block 51) the revision program code 11 and installs (block 52) the revision program code 11 (if that option is selected). The computer 10 then returns from the CRASH program. After the installation, in some embodiments, the operating system 18 is shut down and subsequently rebooted.

Alternatively, the application program 14 may be shut down and restarted after the installation without rebooting the operating system 18. In some embodiments, the revision of the application program 14 occurs seamlessly, and the application program 14 is not shut down.

Besides being an application program, the program 16 may also be, as examples, a DOS-based terminate-and-stay-resident (TSR) program or may be part of the operating system 18 itself, such a dynamic link library (DLL). The program 16 may be a routine that is executed in a system management mode (SMM) of the computer 10.

Figure 4:
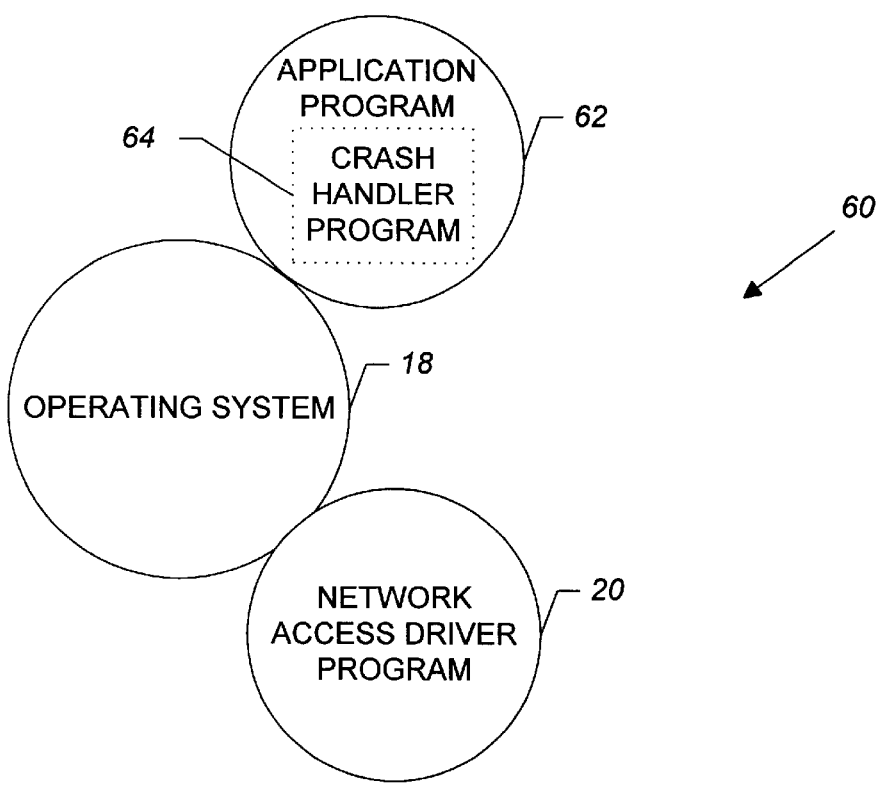
FIGS. 4 and 5 are schematic diagrams illustrating software architectures according to other embodiments of the invention.

Other embodiments are possible. For example, referring to FIG. 4, in another software architecture 60, the crash handler program 16 is replaced by a crash handler routine 64 that is part of (instead of separate from) an application program 62. In this embodiment, the crash handler routine 64 causes the computer 10 to handle crashes for the specific application program 62 and may otherwise behave similarly to the CRASH routine as described above.

Figure 5:
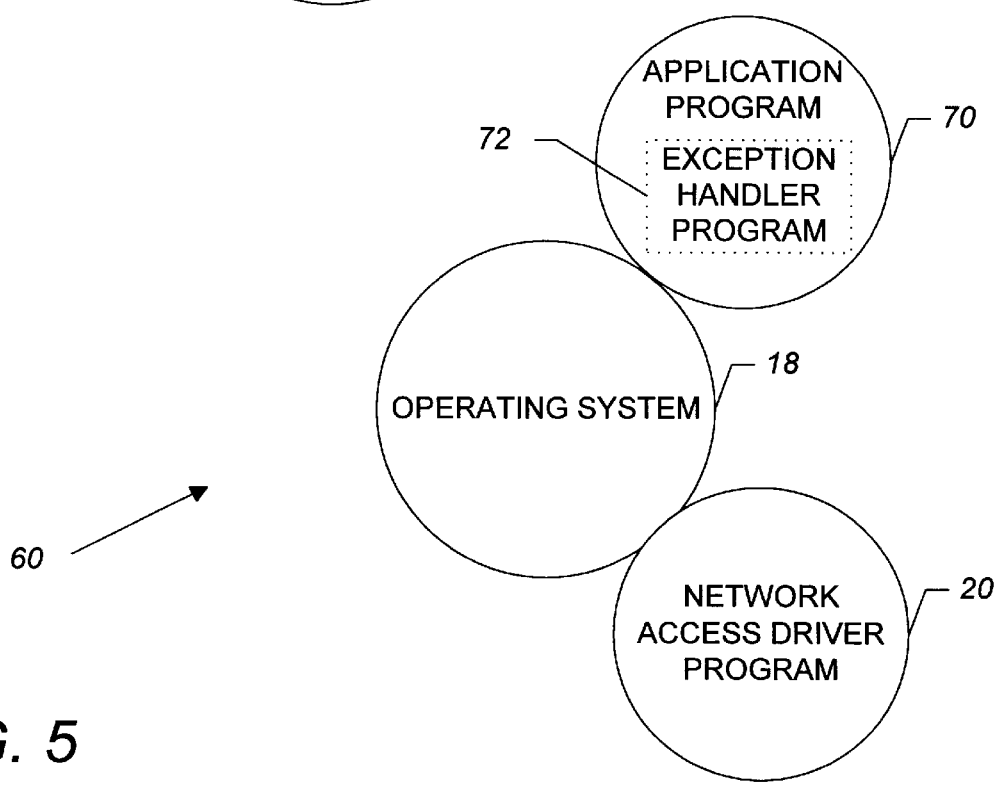

Referring to FIG. 5, instead of handling crashes of an application, in another software architecture 68, an application program 70 includes an exception handler program 72. Instead of accessing the server 12 upon a crash of the program, the exception handler 72 may download revision code when an error occurs in the program 70 that does not necessarily crash the program 70. Otherwise, the exception handler program 70 behaves similarly to the crash handler program 16.

Figure 6:
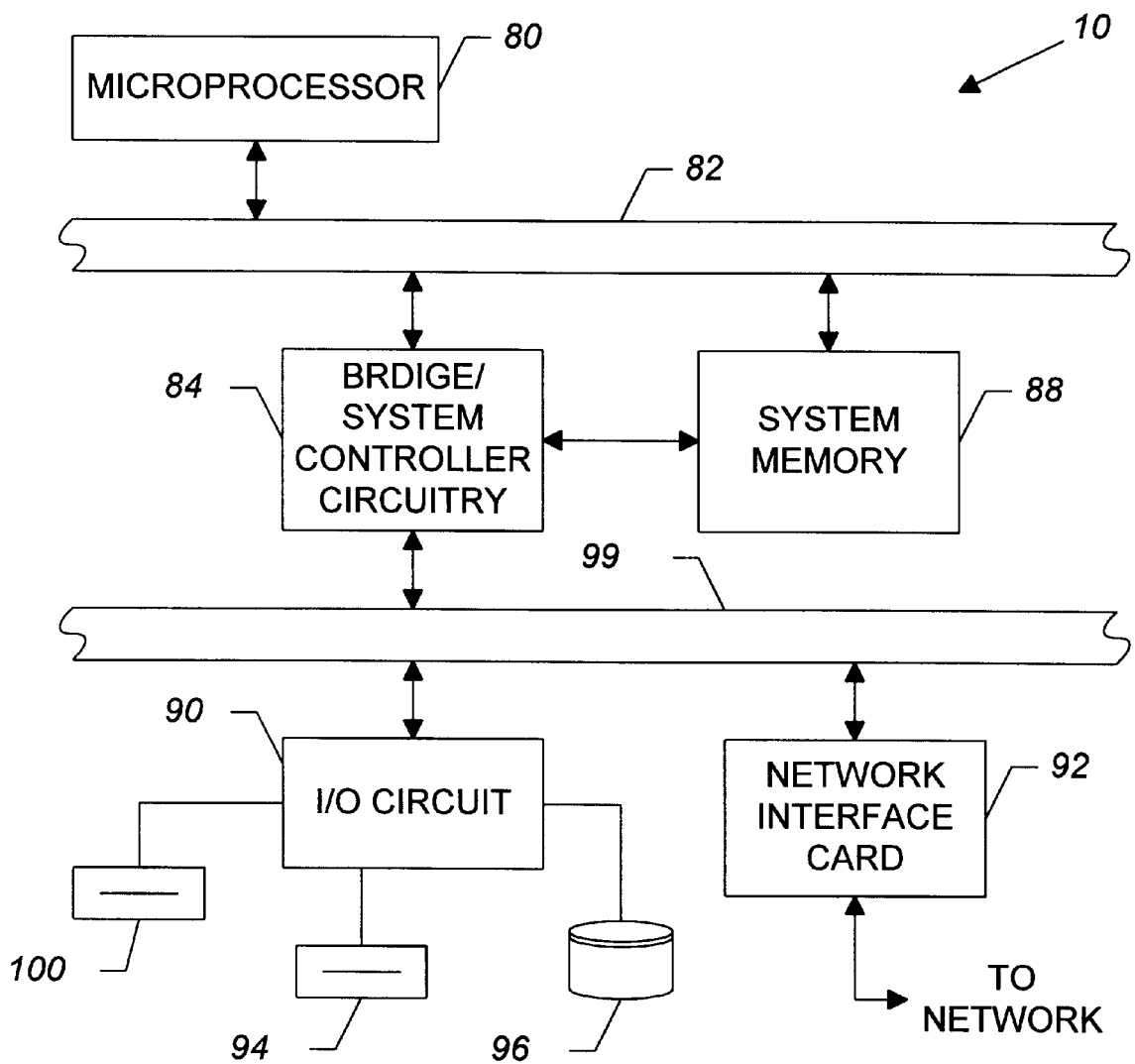
FIG. 6 is a block diagram of one of the computers of FIG. 1.

Referring to FIG. 6, in some embodiments, the computer 10 might include a microprocessor 80 which executes a copy of the crash handler 16 which is stored in a system memory 88. In some embodiments, the microprocessor 80 executes the application program; detects the occurrence of an error in the execution program; and after detection of the error, automatically initiates corrective action to revise the application program. In other embodiments, the computer system may include multiple microprocessors, and some of these microprocessors might perform the above-stated functions.

The memory 88, the microprocessor 80 and bridge/system controller circuitry 84 are all coupled to a host bus 82. The circuitry 84 also interfaces the host bus 82 to a downstream bus 99 which is coupled to an I/O controller 90 and a network interface card 92. The network interface card 92 may interface the computer 10 to a communication link 15 which permits communication between the two computers 10 and 12. The computer 10 may also have, as examples, a CD-ROM drive 100, a floppy disk drive 94 and/or a hard disk drive 96.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method comprising:

executing a program on a first computer;

detecting when an error occurs in the execution of the program; and in response to the detection of the error in the execution of the program, automatically retrieving revision code stored on another computer to revise the program without rebooting the first computer.

2. The method of claim 1, wherein the act of detecting includes redirecting a response to an interrupt request.

3. The method of claim 1, wherein the act of retrieving includes automatically transmitting a state of the first computer to said another computer.

4. The method of claim 1, including allowing the error to cause a failure of the program.

5. The method of claim 1, including preventing the error from causing a failure of the program.

6. A computer system comprising a computer that includes:

a memory to store a program; and a microprocessor to:

execute the program, detect the occurrence of the error in the execution of the program, and in response to the detection of the error in the execution of the program, automatically initiate corrective action to revise the program without rebooting the computer system.

7. The computer system of claim 6, further comprising:

another computer to store revision code for preventing a predetermined error from occurring in the execution of the program, wherein the microprocessor initiates corrective action by communicating with said another computer to revise the program.

8. The computer system of claim 6, wherein the microprocessor initiates corrective action by:

prompting a user for an input, and in response to the input, determining whether to contact another computer to revise the program.

9. The computer system of claim 6, wherein the microprocessor detects the occurrence of the error by redirecting a response to an interrupt request.

10. The computer system of claim 6, further comprising:

another computer to store revision code for preventing a predetermined error from occurring in the execution of the program, wherein the microprocessor initiates corrective action by communicating with said another computer to transfer a state of the first computer to said another computer.

11. The computer system of claim 6, wherein the error causes a failure of the program.

12. The computer system of claim 6, wherein the error does not cause a failure of the program.

13. An article comprising a computer readable storage medium including instructions that cause a computer to:

detect when an error occurs in the execution of a program by the computer; and in response to the detection of the error in the execution of the program, automatically initiate corrective action to revise the program without rebooting the computer.

14. The article of claim 13, further comprising instructions to cause the computer to initiate the corrective action by automatically retrieving revision code stored on another computer to revise the program.

15. The article of claim 13, further comprising instructions to cause the computer to initiate the corrective action by prompting a user for an input and in response to the input, contacting another computer to retrieve revision code.

16. The article of claim 13, further comprising instructions to cause the detection by causing the computer to redirect a response to an interrupt request.

17. The article of claim 13, further comprising instructions to initiate the corrective action by causing the computer to automatically transmit a state of the computer to another computer.

18. The article of claim 13, wherein the error causes a failure of the program.

19. The article of claim 13, wherein the error does not cause a failure of the program.

20. A method comprising:

executing a program on a first computer;

detecting when an error occurs in the execution of the program; and in response to the detection of the error in the execution of the program, automatically prompting a user for an input and in response to the input, determining whether to contact another computer to revise the program without rebooting the first computer.

21. The method of claim 20, wherein the act of detecting includes redirecting a response to an interrupt request.

22. The method of claim 20, further comprising:

contacting said another computer.

23. The method of claim 20, including allowing the error to cause a failure of the program.

24. The method of claim 20, including preventing the error from causing a failure of the program.

* * * * *